United States Patent [19]

Mulder et al.

[11] Patent Number: 5,515,347
[45] Date of Patent: May 7, 1996

[54] ARRANGEMENT FOR SELECTING TITLES FROM A STORAGE MEDIA CONTAINING A NUMBER OF RECORDING TITLES IN A MAGAZINE

[75] Inventors: Arjen J. Mulder, Manubach; Thomas Kuehl, Daxweiler, both of Germany

[73] Assignee: NSM Aktiengesellschaft, Bingen, Germany

[21] Appl. No.: 256,587

[22] PCT Filed: Jan. 13, 1993

[86] PCT No.: PCT/DE93/00024

§ 371 Date: Jul. 21, 1994

§ 102(e) Date: Jul. 21, 1994

[87] PCT Pub. No.: WO93/14502

PCT Pub. Date: Jul. 22, 1993

[30] Foreign Application Priority Data

Jan. 16, 1992 [DE] Germany .......................... 42 00 898.0

[51] Int. Cl.⁶ .................................................. G11B 17/22
[52] U.S. Cl. ................................................ 369/30; 369/36
[58] Field of Search .................................. 369/30, 36, 38, 369/75.2, 77.1, 77.2, 192, 13; 360/98.06, 59, 114

[56] References Cited

U.S. PATENT DOCUMENTS 4,675,755  6/1987  Baumeister et al. ................... 360/35.1
5,228,016  7/1993  Menke ..................................... 369/36

FOREIGN PATENT DOCUMENTS

| 0265167 | 4/1988 | European Pat. Off. . |
| 0359541 | 3/1990 | European Pat. Off. . |
| 0425168 | 5/1991 | European Pat. Off. . |
| 0455934 | 11/1991 | European Pat. Off. . |
| 2517863 | 6/1983 | France . |
| 3842149 | 6/1990 | Germany . |
| 61-77182 | 8/1986 | Japan . |
| 2240869 | 8/1991 | United Kingdom . |
| 2241105 | 8/1991 | United Kingdom . |

*Primary Examiner*—Ali Neyzari
*Attorney, Agent, or Firm*—Spencer & Frank

[57] ABSTRACT

A system which enables the titles of recordings to be selected from storage media containing a number of titles and held in a magazine, in particular the titles of CDs housed in a number of CD boxes. The storage media include a list of the recording titles they contain. Also called for is a player for the recordings. The system includes a device, forming part of the recording player, which enables titles selected from any of the storage media to be played; a decoding device, forming part of the recording player, which converts keyed-in code numbers into title selections; a light pen, connectable to the player, for reading bar codes, with the bar codes thus read being fed to the decoder; and a compilation, separate from the storage media and recording player, of bar codes, each of which corresponds to one of the stored titles of the recordings and can be read by the light pen.

13 Claims, 1 Drawing Sheet

ARRANGEMENT FOR SELECTING TITLES FROM A STORAGE MEDIA CONTAINING A NUMBER OF RECORDING TITLES IN A MAGAZINE

BACKGROUND OF THE INVENTION

The invention relates to an arrangement for selecting titles from storage media respectively containing a number of recording titles in a magazine, particularly of CD's in CD boxes containing a plurality of CD's, the storage media bearing a list of the recording titles they contain, and a playback device being provided.

Coin-operated jukeboxes that have a CD magazine as well as a list of titles and a selection keyboard are found in a number of restaurants. After the deposit of coins and operation of the selection keyboard, the corresponding CD's are removed from the magazine, and the selected titles are played. Diverse devices for playing back selected titles are known (see, for example, DE-OS 3,922,721).

In a similar manner, in the interim there are also CD's, i.e. optical disks, that are housed in so-called CD boxes. If certain titles of these CD's are to be played, they must be, as before, selected or entered in a relatively involved manner. According to a first alternative, in a known way a selection keyboard having visual title information is operated.

The second alternative provides for the entry of a code. In this instance, the user must first determine a code associated with the desired recording title. Subsequently the code corresponding to the relevant CD must be entered, then usually a further two- or three-character code and, finally, usually a two-character title code. This means that, in total, at least a five-character code must be used. Should a plurality of recording titles be entered at one time in order to establish a playback sequence at the outset, this procedure proves involved and prone to errors, since the effort involved in entry is considerable.

The use of visual or bar codes is known to anyone in the area of retail, and particularly department stores, for entering the type of good and the sale price.

A CD handling system has also already been developed that permits the management and registration of CD's and their location by utilizing bar codes (see "Discover" brochure of the firm of Playsafe Monitoring Limited, Bath, Great Britain).

SUMMARY OF THE INVENTION

The object of the invention is to permit recording titles to be selected from a number of storage media in a magazine, particularly CD's, in a simple manner.

This object is accomplished according to the invention by the arrangement according to the invention which permits the selection of titles from storage media in a magazine respectively containing a plurality of recording titles, particularly CD's in CD boxes containing a plurality of CD's. The storage media bear a list of the recording titles they contain, and a playback device is provided. The arrangement encompasses a device of the playback device that permits the playback of recording titles selected from the respective storage media, a decoding device of the playback device that converts entered codes into selected recording titles, a light pen for reading visual codes, which can be connected to the playback device, the read codes being supplied to the decoding device, and a compilation, separate from the storage media and the playback device, of visual codes that are respectively associated with the individual recording titles of the storage media and can be read by the light pen.

Through the provision of the visual bar code and the decoding device in the playback device, according to the invention, the selection of the desired recording titles is very simple. For the selection procedure, the light pen need merely be taken and drawn across the desired titles, i.e. their visual code, i.e. the selection is completely integrated into the visual title search. The read visual codes are then transmitted by way of a line or by means of remote transmission to the decoding device, from which the selected recording tiles are transmitted to the playback device for playback operation. In this way the operating expenditure for an operator is reduced to a minimum, namely to the actual selection and only the input of a playback command (scan of the title code). Playback, particularly of pieces of music, is in this way not associated with work, and rather means pure enjoyment.

Of course, the playback media need not be only CD's. These can also be, for example, records, cassettes, diskettes, etc. The recording titles can also include, besides pieces of music, spoken works, graphic information, in short, actually any storable unit of information.

The optical codes are advisably a bar code that can be read especially easily.

In a preferred embodiment of the invention, the compilation of the title codes comprises one or a plurality of sheets containing the codes, particularly in the form of a folder, an album or a book. The user then takes the sheet or, for example, the book, and peruses the overview of titles with the typically provided codes. If a corresponding title is to be played, the user need only take the light pen and draw it across the code.

The codes are advantageously provided on stickers. This permits the setup of the title and code compilation by the user himself in a simple manner. In addition, the stickers can later be applied to jackets, content lists, storage containers, etc., of the storage media. The storage media can thus be stored in a conventional manner.

According to the invention, the codes can include first and second codes, the first code being respectively associated with a storage medium and the second code being respectively associated with a recording title of a storage medium in such a way that the combination of the first and second codes permits an unambiguous identification of all playback media in a magazine. Thus, for example, the first code represents the sequence numbers of the storage media, such as CD's, in a combination, and the second code approximately represents the numbers 1 through 30 for the titles. To select a title, then, the CD sequence numbers need only be scanned by the light pen, and then the title code, i.e. the title number, regardless of whether the codes are provided in book form or on the jackets, storage containers, etc. There are two procedures that can be performed automatically, so to speak, by the user.

A practical arrangement for title selection results when the jackets or envelopes are included in the compilations. The title information can then be stored with the pictures in albums or the like, as is known in photography. Each location for a jacket is then provided with a sequence code and the title code.

For storing the title compilations, it is advantageous when a further storage medium is provided for the compilation of the recording title and its code allocation. This permits simple duplication and modification of the title compilations, which can be made visible as a code by means of, for example, a monitor or a printer, and legible for a light pen.

A diskette can further be provided for storing the compilation of the recording titles and their code allocation. This likewise permits a data transfer and output, like the above-named storage media.

For connection to further storage and evaluation media, for example an external input unit and a data line to the playback device can be provided for the input of the selected recorded titles.

Visual operating codes are preferably provided in addition to the selection codes. These can, for example, be the commands "ready," "cancel," "error," etc.

A display device is advisably also provided. This device permits the operator to monitor the selection and input procedure. User instructions for the display device can also be provided, which facilitates operation.

For the transmission of the codes read by the light pen to the playback device, remote transmission is advantageously provided. In this way interfering cables, etc. can be omitted, and operating comfort is increased.

The arrangement according to the invention makes it possible, for example, to bring the information regarding a certain CD and, furthermore, the numbering of the individual pieces to software, so that the relevant title, and not the CD itself, must be entered directly. Rather, the desired information can be entered by way of an arbitrary data carrier, such as a diskette, an additional CD or by way of a data line, corresponding to the configuration of the playback device or further, peripheral devices.

The invention is described further below by way of an embodiment, and in the drawings.

DETAILED DESCRIPTION OF THE PREFERRED EMBODIMENTS

Reference is made below to the drawings. The illustrated embodiment of the arrangement according to the invention relates to CD's housed in, for example, a CD box. The individual CD's are provided with a jacket or an envelope that is respectively removed from the CD cassettes and compiled in book form to simplify title selection.

The playback device itself is provided with a device which, when selected titles or title codes are entered, takes the relevant CD out of the magazine and plays back the selected title.

Figure 1:
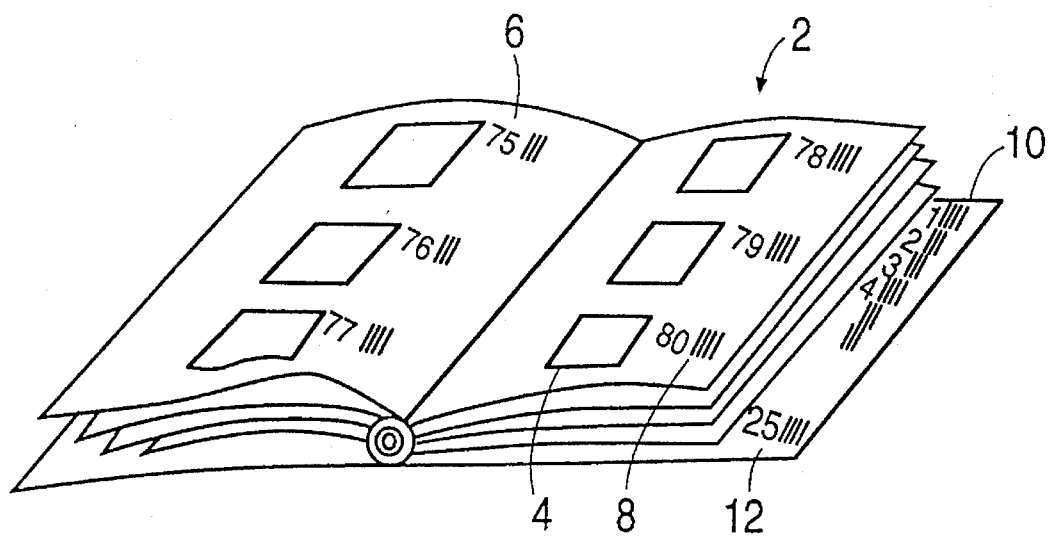
FIG. 1 shows a code compilation for CD titles in book form with, the CD jackets being contained in the book.

FIG. 1 shows an open book 2, in which the jackets 4 of the CD's housed in the CD box are filed. The CD's are identified with progressive, whole-number sequence numbers provided in arabic numerals 6 in the book and in the form of bar codes 8 next to the jackets. In the back of the book, the titles of the CD's are contained one below the other in arabic numerals 10, and in the form of bar codes 12.

The selection process in this embodiment is effected in that first the desired CD is chosen in the front of the book, and its sequence number code is detected by means of a light pen. Subsequently the title portion of the book is opened, and the desired code(s) is (are) selected from the title list and likewise detected by means of the light pen. The transmission of the code is effected by way of data line or remote transmission to the playback device.

Figure 2:
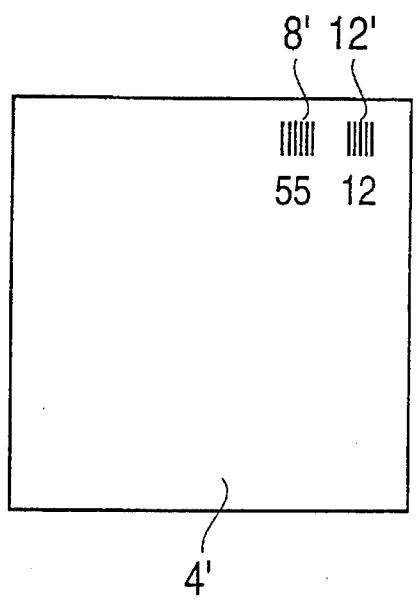
FIG. 2 shows a CD jacket having an associated CD code and title code.

A variation of this embodiment is shown in FIG. 2. In this instance the jacket 4' itself bears the sequence number code 8' and the title code 12', of which only one is illustrated. This simplifies selection, because the title portion of the book need not be opened for every title of a CD.

Incidentally, it is, of course, within the scope of the invention to use a hand scanner as a light pen, with which possibly pictures from CD jackets can be scanned and stored.

We claim:

1. An arrangement for selecting titles from storage media which respectively contain a plurality of recording titles and which are disposed in a magazine, wherein the storage media bear a list of the recording titles they contain, said arrangement comprising; a playback device having a device that permits the playback of selected recording titles from the respective storage media, said playback device further having a decoding device that converts entered codes into selected recording titles; a compilation, separate from the storage media and the playback unit, of visual codes which are respectively associated with the individual recording titles of the storage media; and a light pen for reading selected ones of the visual codes, with said light pen for selecting visual codes of recording titles being connected to the decoding device to supply the read visual codes thereto, and said decoding device being connected to the playback device such that the decoding device transmits to the playback device the recording titles selected by said light pen.

2. An arrangement according to claim 1, wherein the visual codes are bar codes.

3. An arrangement according to claim 1, wherein the compilation of the codes comprise one or a plurality of sheets in the form of a folder, an album or a book form, bearing the codes.

4. An arrangement according to claim 1, wherein the codes are provided on stickers.

5. An arrangement according to claim 1, wherein the codes include first and second codes, wherein the first codes are respectively associated with a storage medium and the second codes are respectively associated with a recording title of a storage medium such that the combination of the first and second codes permits an unambiguous identification of all recording titles in one magazine.

6. An arrangement according to claim 1, wherein the codes are applied to the jackets, or content lists and/or the storage containers of the storage media.

7. An arrangement according to claim 3, wherein jackets for said recording media are included in the compilations.

8. An arrangement according to claim 1, comprising a further storage medium for the compilation of the recording titles and their code allocation.

9. An arrangement according to claim 1, further comprising a diskette for storing the compilation of the recording titles and their code allocation.

10. An arrangement according to claim 1, further comprising an external input unit and a data line to the playback device for the input of the selected recording title.

11. An arrangement according to claim 1, further comprising visual operating codes.

12. An arrangement according to claim 1, further comprising a display device.

13. An arrangement according to claim 1, including remote transmission of the read codes to the playback unit.

* * * * *